Patented Apr. 22, 1941

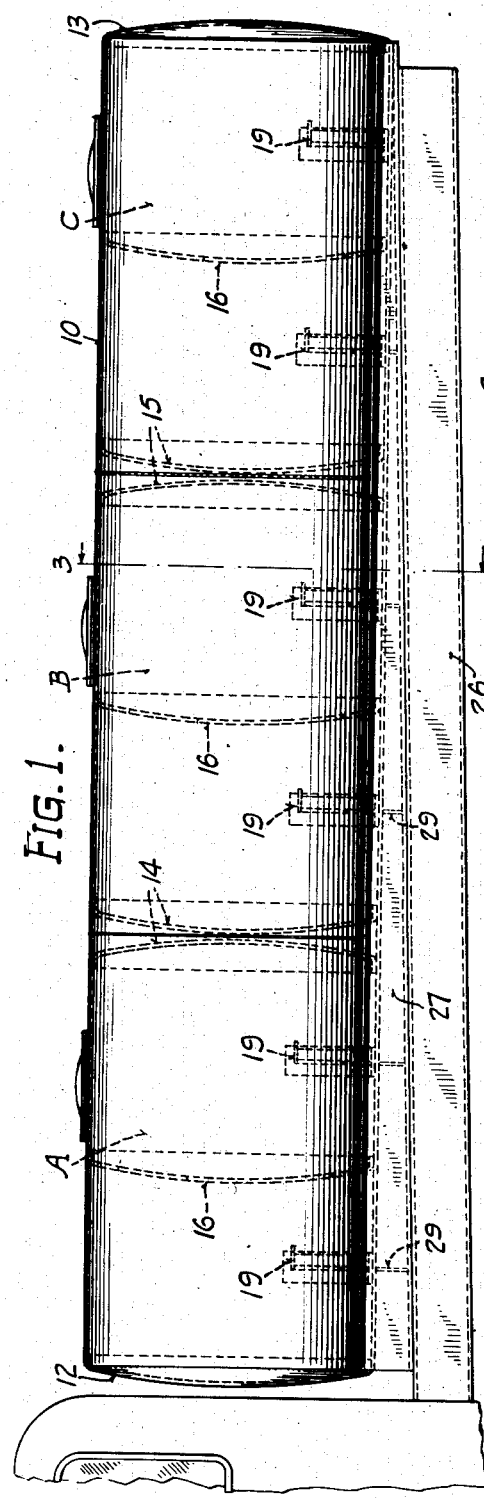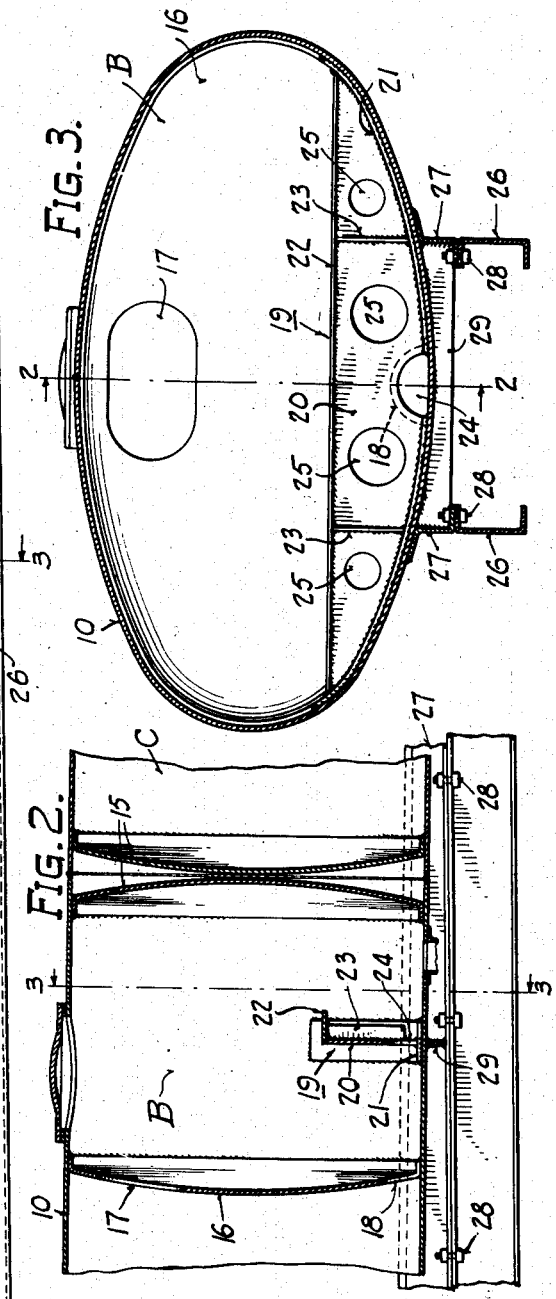
Firth Pierce
INVENTOR.

2,239,507

UNITED STATES PATENT OFFICE 2,239,507

VEHICLE TANK

Firth Pierce, East Los Angeles, Calif., assignor, by mesne assignments, to A. O. Smith Corporation, Milwaukee, Wis., a corporation of New York Application April 20, 1939, Serial No. 268,921

7 Claims. (Cl. 280—5)

This invention relates to improvements in the construction of fluid transporting tanks, such as are used for oil delivery trucks, and has for its main object the fabrication of a tank and frame structure which has a low center of gravity and which will readily resist normal stresses due to road shocks.

Another object is to provide a structure of this nature which is neat in appearance and economical to fabricate.

Other objects will be apparent from the following specification and claims.

An embodiment of the invention is illustrated in the accompanying drawing in which:

Figure 1 is a side elevation of a tank and frame structure made in accordance with the invention;

Fig. 2 is an enlarged longitudinal section of a portion of the structure shown in Fig. 1 and taken on the line 2—2 of Fig. 3; and Fig. 3 is a transverse section taken on the line 3—3 of Figs. 1 and 2.

Referring to the drawing the tank shell 10 is closed at its ends by heads 12 and 13 and is divided into three compartments A, B and C by two pairs of intermediate bulkheads 14 and 15. These heads are preferably arc welded to shell 10 to provide fluid tight joints.

About midway of the length of each compartment a baffle head 16 is positioned and welded along its periphery to the shell 10. These heads 16 prevent surging of the contents of the compartment and act in conjunction with the bulk heads to stiffen the tank transversely. Each head 16 has a manhole 17 near its top and a drain opening 18 in its lower edge.

Departing from the customary practice of mounting the tank upon transverse bolsters outside the tank and supported by the truck frame, transverse bolsters 19 are positioned within the tank and welded to the inside of its lower wall. These bolsters are placed substantially midway between the baffle head and the end heads of each compartment and are about one fourth the height of the tank at its vertical axis. Each bolster comprises a vertical web 20, a lower flange 21, an upper flange 22 and two vertical flanges 23 each extending from the lower to the upper flanges at a position over the side bars of the truck frame. The lower edge of the bolster is curved complementary to the lower tank wall to which it is welded and the upper edge is preferably straight and horizontal but may be formed in any desirable shape. The bolster is provided with a drain opening 24 in its lower edge. Openings 25 may be provided in the web 20 to reduce its weight.

The several members may be arc welded together to form a rigid unitary structure before assembly with the tank or flange 21 may be first welded to the tank wall as two spaced strips to provide for the drain opening 24 and then the web welded to the strips.

Interposed between the tank and a supporting truck frame 26 are a pair of longitudinal opposed sills 27 of Z section which are welded at their upper out-turned flanges to the lower side of the tank and extend for its full length. The sills are so spaced that each one will rest upon its respective side bar of the truck frame and is secured thereto by bolts 28 engaging the lower inturned flange of the sill and the upper inturned flange of the side bar. Transverse plates 29 may be interposed between the sills preferably in line with the bolsters 19 to provide additional rigidity. They are welded to the sills and to the bottom of the tank.

This construction of sill and frame provides an effective longitudinal stiffening means and a support which presents a closed plain side which is neat in appearance.

For axle clearance the truck frame is often inclined upwardly toward the rear, as shown. In this case the sills 27 are tapered toward the rear so as to maintain the tank in a substantially horizontal position, enough tilt being allowed for drainage. Where the truck frame is horizontal, the sills have just enough taper to support the tank at a slight tilt to permit drainage. The sills thus serve as an adapter interposed between the tank and truck frame and may be shaped to meet varying conditions.

With the structure disclosed in the drawing and above described a tank is provided which will readily resist any normal transverse and longitudinal stresses to which it may be subjected in use.

The tank may be provided with any desirable manway openings and drain connections.

Various changes may be made in details of construction without departing from the spirit of the invention or the scope of the following claims.

I claim:

1. In a vehicle tank, a transverse vertical reenforcing plate in the lower part thereof, a flange welded to the lower edge of said plate and to the inside of the lower wall of the tank, a flange at the upper edge of said plate, and vertical ribs edge welded to a side of the plate and engaging said lower and upper flanges and welded thereto.

2. In combination, a vehicle tank, a supporting frame having a pair of spaced side rails, two longitudinal sill members secured to the bottom of the tank and spaced to engage the tops of the side rails to which they are attached, a transverse vertical reenforcing plate in the lower part of the tank, a flange welded to the lower edge of said plate and to the inside of the lower wall of the tank, a flange at the upper edge of said plate, and vertical ribs edge welded to a side of the plate and engaging said lower and upper flanges and welded thereto and spaced to lie in the vertical plane of their respective sill member.

3. In combination, a vehicle tank, a supporting frame having a pair of spaced channel shaped side rails positioned with upper and lower flanges, two longitudinal Z shaped sill members secured to the bottom of the tank by their upper flanges and spaced to engage the upper flanges of the side rails to which they are attached by their lower flanges, a transverse vertical reenforcing plate in the lower part of the tank, a flange welded to the lower edge of said plate and to the inside of the lower wall of the tank, a flange at the upper edge of said plate, and a pair of vertical ribs edge welded to a side of the plate and engaging said lower and upper flanges and welded thereto and spaced apart to lie in the vertical plane of the web of their respective sill member.

4. In a vehicle tank, a transverse vertical reenforcing member in the lower part thereof having a height of approximately one-fourth that of the tank and having a lower edge complementary to the lower inside wall of the tank and a drain opening therein, and having a substantially straight horizontal upper edge.

5. In a vehicle tank, a pair of circumferentially disposed bands welded to the lower inside wall thereof and spaced endwise to permit drainage, a transverse vertical reenforcing member of a height less than half that of the tank and having a lower edge complementary to said bands and welded thereto, said vertical plate having a drain opening at the space between the bands and a straight horizontal upper flanged edge.

6. In a vehicle tank, a strip of metal bent to conform to the curvature of the tank, and welded around its edges to the inside well of the tank, the strip extending transversely of the tank along a substantial portion of the lower surface of the tank, and a vertical reinforcing plate extending transversely of the tank and having its lower edge cut to conform to the curvature of the tank and edge welded to the center of said strip.

7. In a vehicle tank, a strip of metal bent to conform to the curvature of the tank, and welded around its edges to the inside wall of the tank, the strip extending transversely of the tank along a substantial portion of the lower surface of the tank, and a vertical reinforcing plate extending transversely of the tank and having its lower edge cut to conform to the curvature of the tank and edge welded to the center of said strip, said vertical plate having a horizontal flange at its upper edge and vertical ribs secured thereto for stiffening the flange and plate.

FIRTH PIERCE.